(12) United States Patent
Nefedov

(10) Patent No.: US 6,704,368 B1
(45) Date of Patent: Mar. 9, 2004

(54) CODING AND MODULATION METHOD AND APPARATUS FOR ITS IMPLEMENTATION

(75) Inventor: Nikolai Nefedov, Espoo (FI)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/198,213

(22) Filed: Nov. 23, 1998

(30) Foreign Application Priority Data

Nov. 28, 1997 (FI) .................................................. 974361

(51) Int. Cl.[7] ............................ H04L 23/02; H04L 5/12
(52) U.S. Cl. ......................... 375/265; 375/264; 714/790
(58) Field of Search ................................ 375/262, 264, 375/265, 286, 298, 341; 714/752, 790, 791, 796

(56) References Cited

U.S. PATENT DOCUMENTS

| | | | |
|---|---|---|---|
| 4,973,923 A | 11/1990 | Kuisma | 332/117 |
| 5,091,919 A | 2/1992 | Kuisma | 375/60 |
| 5,124,672 A | 6/1992 | Kuisma | 332/103 |
| 5,231,364 A | 7/1993 | Mucke | 332/105 |
| 5,311,151 A | 5/1994 | Vaisanen | 332/105 |
| 5,357,221 A | 10/1994 | Matero | 332/123 |
| 5,371,481 A | 12/1994 | Tiittanen et al. | 332/103 |
| 5,392,460 A | 2/1995 | Mattila et al. | 455/76 |
| 5,446,422 A | 8/1995 | Mattila et al. | 332/103 |
| 5,469,126 A | 11/1995 | Murtojarvi | 332/105 |
| 5,678,224 A | 10/1997 | Murtojarvi | 455/326 |
| 5,731,772 A | 3/1998 | Mikkola et al. | 341/118 |
| 5,787,362 A | 7/1998 | Matero | 455/553 |
| 5,812,601 A * | 9/1998 | Schramm | 375/262 |
| 6,023,783 A * | 2/2000 | Divsalar et al. | 714/792 |

OTHER PUBLICATIONS

Divalar, D. and Pollara, F., "Serial and Hybrid concatenated Codes with Applications", Intern. Symposium on Turbo Codes and Related Topics, Sep. 3–5, 1997, Chapters 1, 6, 8.

Jung–Fu Cheng et al., "Complexity–reduced multilevel coding with rate–compatible punctured convolutional codes", IEEE, Nov. 29, 1993, pp. 814–818.

ETSI SMG, "Edge Feasibility Study Work Item 184; Improved Data Rates Through Optimised Modulation Version 1.0", ETSI TC SMG Meeting No. 24, Dec. 1997, pp. 1–41.

"A New Multilevel Coding Method Using Error–Correcting Codes" Imai et al., IEEE Transactions on Information Theory, vol. IT–23, No. 3, 1977.

"EDGE Feasibility Study, Work Item 184; Improved Data Rates through Optimised Modulation"; ETSI STC SMG2.

"Channel Coding with Multilevel/Phase Signals", G. Ungerboeck, IEEE Transactions on Information Theory, vol. IT–28, pp. 55–67, No. 1, Jan. 1982.

"Turbo–Codes and High Spectral Efficiency Modulation", Le Goff et al.; Proceedings of IEEE ICC'94 pp. 645–649.

"Hybrid Concatenated Codes and Iterative Decoding", Divsalar et al., TDA Progress Report 42–130, Aug. 1997.

* cited by examiner

Primary Examiner—Phoung Phu
(74) Attorney, Agent, or Firm—Perman & Green LLP

(57) ABSTRACT

For conveying coded digital information in the form of multiple-valued symbols from a transmitter to a receiver, the steps of
a) encoding digital information in a Hybrid Concatenated Code encoder (501),
b) mapping the encoded digital information into multiple-valued symbols in a Multi-Level Coding encoder (511, 512a–d, 513, 514),
c) transmitting the multiple-valued symbols,
d) receiving the multiple-valued symbols, and
e) decoding the received multiple-valued symbols in a Multi-Stage Decoder (800)

are employed.

12 Claims, 8 Drawing Sheets

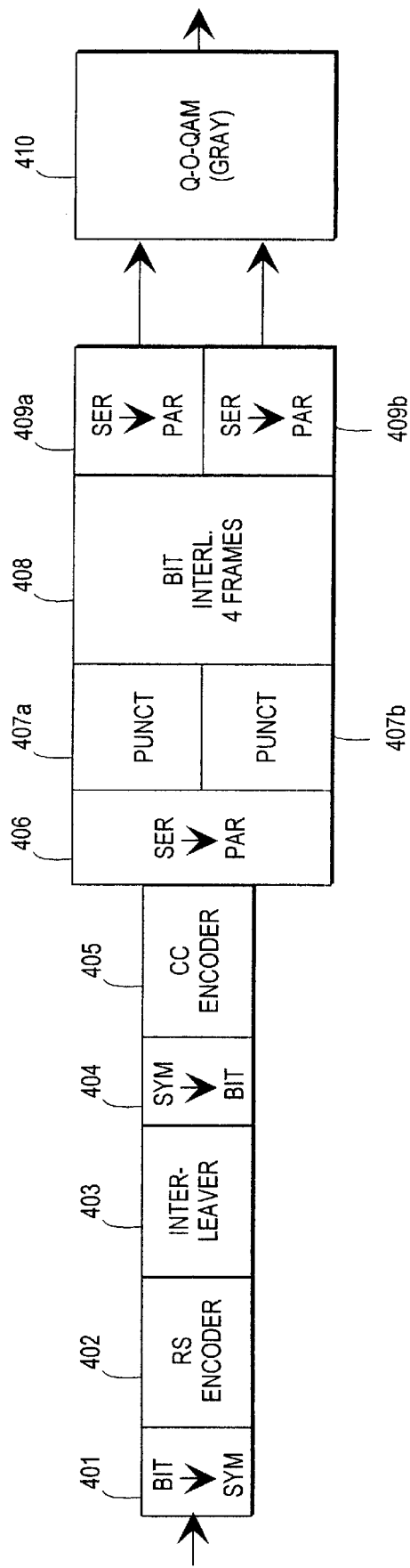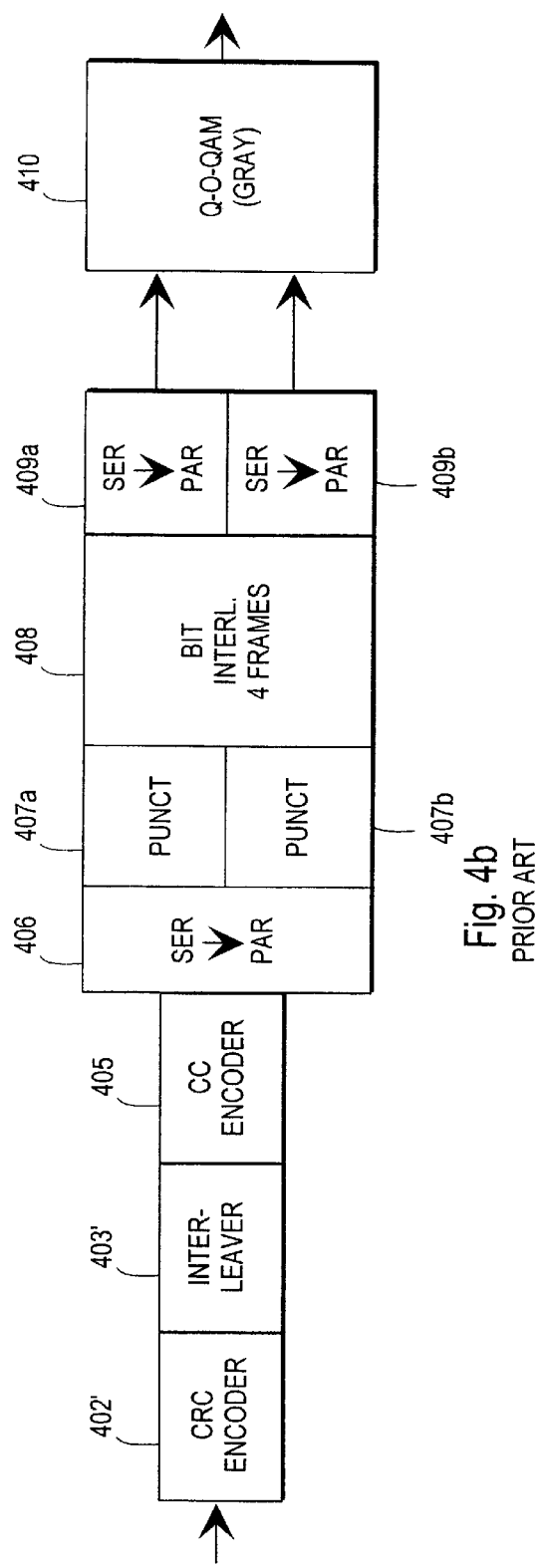
Fig. 4a PRIOR ART
Fig. 4b PRIOR ART

CODING AND MODULATION METHOD AND APPARATUS FOR ITS IMPLEMENTATION

TECHNOLOGICAL FIELD

The invention relates to combining coding and modulation that are used to handle a digital signal for high-frequency transmission in a noisy channel.

BACKGROUND OF THE INVENTION

In an attempt to increase the communication speed of digital radio systems, binary signals have been replaced by multiple-valued signals in connection with a high-level modulation scheme. Here we consider 16-QAM (16-level Quadrature Amplitude Modulation) as an example of high-level modulation. Multiple-valued signals require the signal encoder and decoder to have special properties. FIG. 1 illustrates a multi-level encoding and decoding arrangement known from the document "H. Imai, S. Hirakawa: A New Multilevel Coding Method Using Error-Correcting Codes, IEEE Transactions on Information Theory, Vol. IT-23, No. 3, 1977", which is incorporated herein by reference. Encoder 100 consists of a serial/parallel conversion circuit 101, M parallel binary encoders 102–105, where M is a positive integer (here M=4), and a mapping circuit 106. The output signal of the encoder 100 travels through a channel 107 and reaches a decoder 108 including a demultiplexing decoding circuit 109, which produces M parallel signal estimates, and a selection circuit 110, which reconstructs the original information from the estimates at its input. Modulation and demodulation are included in the channel part 107 of FIG. 1.

The serial/parallel conversion circuit 101 converts a stream of binary symbols into M component streams which may have different rates. Each component stream is fed into its own binary encoder 102–105. The generic definition of a multi-level encoder sets very few specific requirements to the parallel binary encoders 102–105, although in many cases they are selected to produce a coded data stream of equal rate. The mapping circuit 106 reads bits from the output of each binary encoder and maps these bits into a corresponding multi-level signal, which has one of the $2^M$ allowed levels or states. Especially in the case of $2^M$-order QAM modulation M must be even and the output states of the mapping circuit 106 correspond to the allowed phase and amplitude value combinations of an oscillating signal.

FIG. 3 illustrates a so-called multi-stage decoder 300 that can be used as the decoder 108 in the arrangement of FIG. 1. At each sampling moment the input signal in line 301 is supposed to be in one of the $2^M$ allowed states. The first metric block 302 produces a metric or a probability value that indicates, whether the least significant bit describing the state of the input signal should be 0 or 1. A decision of the corresponding decoded bit value is made in the first decoder 306. At each further horizontal level of the multi-stage decoder one of the decoders 307–309 makes a further decision, and each of the encoders 310–312 provides the respective decision in re-encoded form as an additional input to the metric block 303–305 of the remaining levels. Delay elements 314–319 take care of the mutual timing of the signal parts before and after decoding, so that after the last decision about the decoded bit value is made in block 309, multiplexer 320 may construct the original bit stream from the outputs of delay elements 317–319 and decoder 309 in a way that is reciprocal to the operation of the serial/parallel conversion circuit 101 in the transmitter (see FIG. 1).

If the computational capacity of the receiving device is high enough with respect to the rate of the incoming received signal, a feedback connection could be arranged from decoder 309 to the first metric block 302 through an additional encoder. The resulting device would be capable of so-called iterative decoding, where the first round of decisions in the decoder blocks 306 to 309 serves as an input to a second (iterative) round and so on. The more iterations on each symbol, the smaller the chance of an erroneous decoding decision.

The problem of a conventional MLC-MSD arrangement (Multi-Level Coding-Multi-Stage Decoding) is its inflexibility with respect to varying rates of coding. A radio channel is prone to fluctuating noise and interference, so different coding rates are required at different times. If the radio capacity (in terms of frequency and time) allocated to a certain radio connection is fixed and interference conditions suddenly get worse, it may be necessary to increase the amount of coding and decrease the effective data rate correspondingly to get even some data through to the receiving station. Similarly if the interference eases off, the transmitting device may use the chance to reduce coding, thereby increasing the effective data rate. This approach is naturally applicable to non-real time connections (so-called non-transparent data services) only, where a fixed data rate is not required. However, the radio system may allow the radio capacity allocations of separate connections to vary, whereby a real-time connection (transparent data services) can sustain its fixed data rate at all times and simultaneously fight interference with a variable coding rate together with a variable amount of reserved radio capacity. In any case it may be necessary to have a maximum coding rate close to 1 (exactly 1 means that no redundancy is added by coding) and a minimum coding rate as low as 0.1 (meaning that ten coded bits are transmitted per each data bit), and the possibility of choosing more or less freely therebetween according to need.

A conventional approach to enable a selection of coding rates is known from the publication "EDGE Feasibility Studies, Work Item 184: Improved Data Rates through Optimised Modulation; ETSI STC SMG 2, Munich, Germany, May 12–16, 1997", which is incorporated herein by reference. This approach for transparent data services is illustrated in FIG. 4b, where data bits are input into block 401 and coded symbols are output from block 410. Blocks 401 to 405 form a so-called concatenated encoder, where block 401 first maps the data bits into preliminary symbols, block 402 performs RS (Reed-Solomon) encoding on those, block 403 interleaves the RS-coded preliminary symbols within a selectable interleaving length N1 and block 404 maps the result again into bits. A fixed-rate convolutional encoder 405 with codingrate ⅓ adds redundancy to the bit stream. The serial to parallel converter 406 sends groups of four consecutive bits in parallel into puncturing blocks 407a and 407b and after that an additional interleaver 408 performs bit interleaving over an interleaving period of four frames. Further serial to parallel converters 409a and 409b are used to feed the four manipulated parallel bit streams into a Q-O-QAM mapper 410 which operates according to a so-called Gray mapping to produce the output symbols. FIG. 4b illustrates a corresponding approach for non-transparent data services, where the RS encoder 402 has been replaced with a simple CRC (Cyclic Redundancy Check) encoder 402' which adds to the bit stream a CRC checksum at predetermined intervals called frames. The purpose of a CRC checksum in each frame is not to correct errors in received frames but to detect them so that the receiving device may ask for a retransmission of a defective frame. Because the CRC calculation takes place on bit level, the conversion blocks 401 and 404 of FIG. 4a may be omitted and the interleaver block 403' operates on bits and not preliminary symbols like block 403 in FIG. 4a.

One of the drawbacks of the prior art arrangements of FIGS. 4a and 4b is that iterative decoding and Multi-Stage Decoding cannot be used as the decoding method, which impairs the performance of the system in comparison with the theoretical optimum. Another drawback is that to meet the ETSI standards (European Telecommunications Standards Institute) for real-time (transparent) data services, the concatenated codes used in blocks 402 and 405 must be rather complicated. Additionally to implement both transparent and non-transparent data services at least two alternative outer encoders are needed (blocks 402 and 402') in the transmitter with the corresponding alternative decoders in the receiver, which makes the structures rather complex.

SUMMARY OF THE INVENTION

It is the object of this invention to provide a method and apparatus for encoding, modulating, demodulating and decoding in a radio system employing multiple-valued signals in transmission. It is a further object of the invention to keep the required hardware simple despite of variable coding rates and data services.

The objects of the invention are fulfilled by using multi-level coding and multi-stage decoding with hybrid concatenated codes as the component codes in the encoder.

The method according to the invention is characterised in that it comprises the steps of
   a) encoding digital information in a Hybrid Concatenated Code encoder,
   b) mapping the encoded digital information into multiple-valued symbols in a Multi-Level Coding encoder,
   c) transmitting the multiple-valued symbols,
   d) receiving the multiple-valued symbols, and
   e) decoding the received multiple-valued symbols in a Multi-Stage Decoder.

The invention also applies to a transmitting device which is characterised in that it comprises
   a Hybrid Concatenated Code encoder for encoding the digital information to be transmitted and
   a Multi-Level Coder for mapping the encoded digital information into multiple-valued symbols,
and to a cellular radio system which is characterised in that it comprises at least one such transmitting device.

According to the invention, a Hybrid Concatenated Code encoder (HCC encoder) is used together with a Multi-Level Coding scheme (MLC scheme). Each component code of the Multi-Level Encoder consists of an HCC part, which is common to all component codes and can be implemented in a single HCC encoder before dividing the stream of data bits into variable rate component streams, and a puncturing part which is implemented separately to each component stream and which reduces the bit rate of each component stream to a common bit rate. The parallel punctured component streams can then be used as inputs to the symbol mapper using set partition mapping in the MLC scheme. Multi-Stage Decoding (MSD) can be used in the receiver to decode the received signal.

An HCC encoder consists of at least two parallel coding paths and a multiplexer (or a switch) that selects only one coding path at a time for use. One of the coding paths includes at least two concatenated simple encoders which are called the inner encoder and the outer encoder: both the inner and outer encoders are most advantageously systematic convolutional encoders with a relatively low number of states. Their operation is most advantageously complemented with a puncturing block and some interleaving. Another coding path includes only one encoder and possibly an interleaver. Together with the puncturing blocks (that reduce the data rate of the component streams after the serial to parallel conversion in the MLC encoder) the HCC encoder implements a so-called Rate Compatible Punctured Code system, where the HCC encoder implements a "mother" code and the puncturing blocks take care of the adaptation of the overall coding rate to a required level.

In the receiver according to the invention, a Multi-Stage Decoder (MSD) performs demodulation and decoding from symbols into coded data bits, which are directed into a structure that is a counterpart to the HCC encoder: a demultiplexer connects the stream of coded data bits either to a one-stage decoder (if the simpler coding path was used in the HCC) or to a two-stage decoder. Iterative decoding calculations are possible both in the MSD and the latter decoder if the requirements for decoding delay are loose enough and if the receiver has the required computational capacity.

BRIEF DESCRIPTION OF THE DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIG. 4a illustrates another known encoding scheme for transparent data services, FIG. 4b illustrates another known encoding scheme for non-transparent data services.

DETAILED DESCRIPTION OF THE INVENTION

The description of prior art referred to FIGS. 1, 3, 4a and 4b, so the following description of advantageous embodiments of the invention will focus on FIGS. 2 and 5 to 11. In the description, 16QAM is considered as an example of a high-level modulation method. The invention is not limited to the use of 16QAM.

Figure 1:
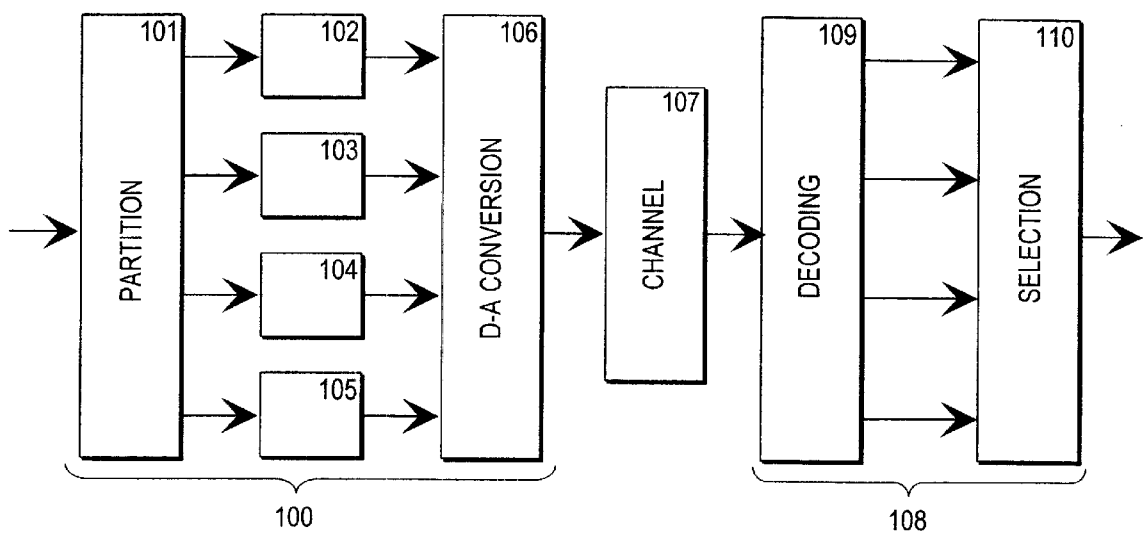
FIG. 1 illustrates a known encoding and decoding arrangement.
Figure 2:
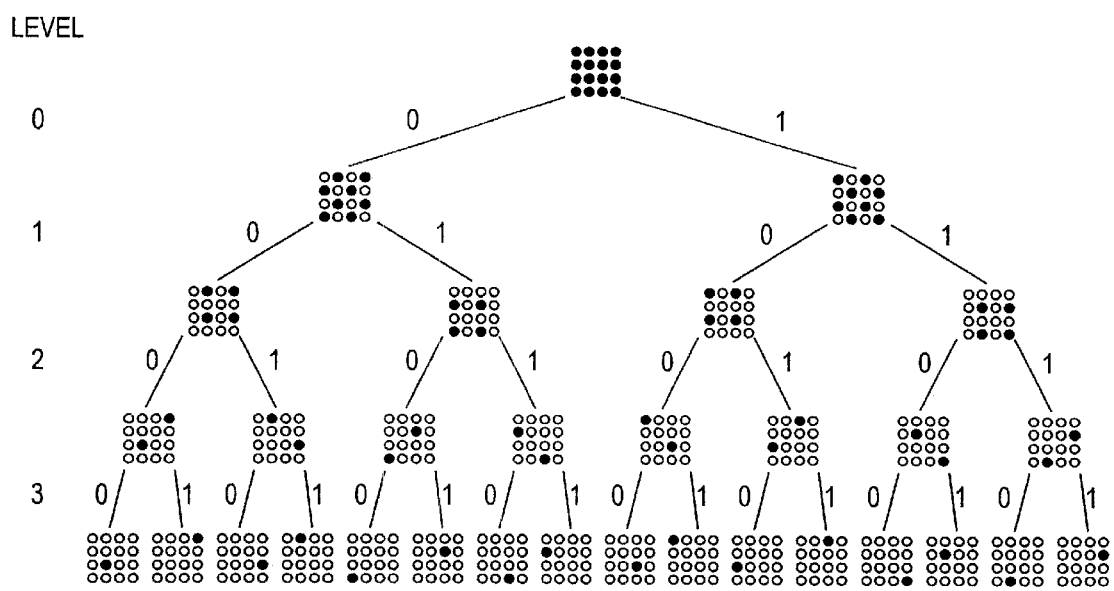
FIG. 2 illustrates a partition tree known as such.

One possible way to represent the allowed output states of a QAM encoder with $2^M$ allowed output states is a partition tree like the one in FIG. 2, where the topmost branching level is level 0 and the bottom branching level is level M−1 which means here level 3. At each level the black dots in the dot matrix represent the allowed output state possibilities in the corresponding partition branch at the corresponding level. The binary encoder output (here: encoder 102 output) that has been defined as the least significant bit (LSB) at the input of the mapping circuit 106 defines, which subset of allowed output state possibilities is chosen at the topmost level and so on, until at the bottom level the encoder output (here: encoder 105 output) that has been defined as the most significant bit (MSB) defines, which one of the remaining two possible output states is taken. With the selection of states (the black dots) as depicted in FIG. 2, the partition tree defines a so-called Ungerboeck Mapping known as such from the document "G. Ungerboeck: Channel Coding with Multilevel/Phase Signals, IEEE Trans. Inform. Theory, vol. IT-28, pp. 55–67, No. 1, January 1982", which is incorporated herein by reference. The use of Ungerboeck mapping or more generally set partition mapping is advantageous in the method and apparatus according to the invention, because in contrast to for example Gray mapping, set partition mapping means that at the symbol decoding stage there is dependency between the decoding decision of the less and more significant bits of the symbol, which dependencies may be used to improve the decoding on each bit level.

Figure 5:
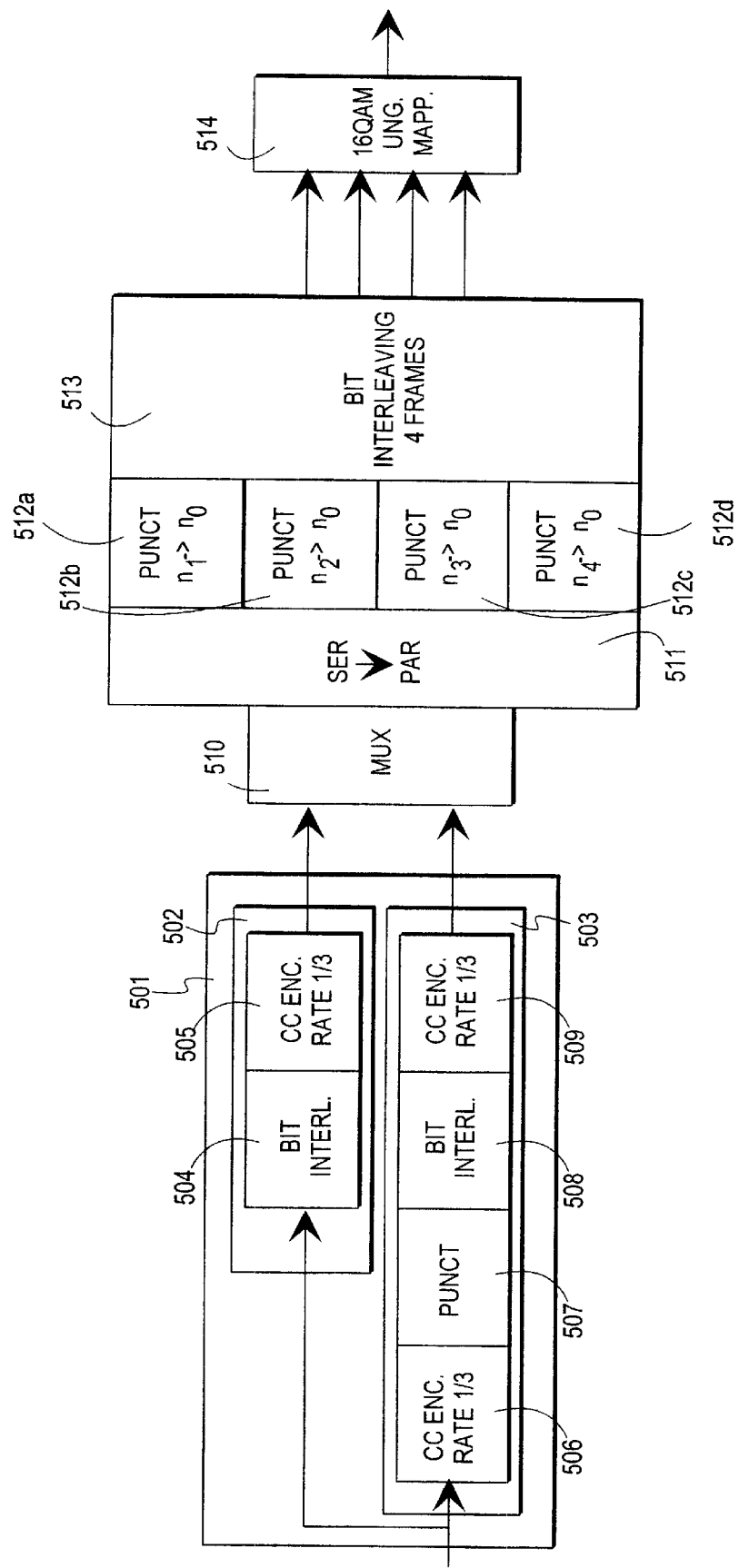
FIG. 5 is a schematic block diagram of an encoder according to the invention.

FIG. 5 illustrates a coding structure according to an advantageous embodiment of the invention. Data bits come from the left in the form of a serial bit stream and 16-QAM symbols are output to the right. The Hybrid Concatenated Code block (HCC block) 501 is the first block into which the data bits are fed and it consists of two alternative coding paths 502 and 503. The upper coding path 502 consists of a bit interleaver 504 and an encoder (possibly a Convolutional Code encoder) 505 which has a certain fixed coding rate, for example 1/3. Blocks 504 and 505 are connected in series in this order. The invention does not limit the selection of the coding rate or the structure of the encoder 505, but they may be selected according to an analysis of a typical radio channel and the requirements it imposes on coding. The lower coding path 503 consists of an outer CC encoder 506, a puncturing block 507, a bit interleaver 508 and an inner CC encoder 509, all connected in series in this order. The inner CC encoder 509 is in the illustrated embodiment a Recursive Systematic Convolutional Code encoder (RSCC encoder). The coding rates of encoders 506 and 509 are typically 1/3 but the same non-limiting nature of the invention applies to them as well as to block 505.

Multiplexer 510 acts as a selection switch that selects encoded bits either from the first coding path 502 or the second coding path 503. Multiplexer 510 changes its selected bit source only in situations where the overall coding rate of the system must be changed. The encoded bit stream is divided into four substreams in the serial to parallel converter 511. The substreams have generally different bit rates $n_1$, $n_2$, $n_3$ and $n_4$, which are reduced into a common bitrate $n_0$ by puncturing in the four parallel pucturing blocks 512a to 512d. A bit interleaver 513 distributes the bits in the four parallel punctured bit streams into K consecutive frames, where K is a positive integer. Here we suppose that K equals 4. The invention does not require the frame length or the frame interleaving length K to be determined in any specific way. After interleaving there are four equal-rate parallel bit streams which are fed into block 514 which takes one bit from each stream and maps the corresponding four-bit binary number into a 16-level symbol according to a selected mapping strategy. Here the symbols are 16QAM symbols and the mapping takes place according to a selected set partitioning mapping strategy.

Figure 6A:
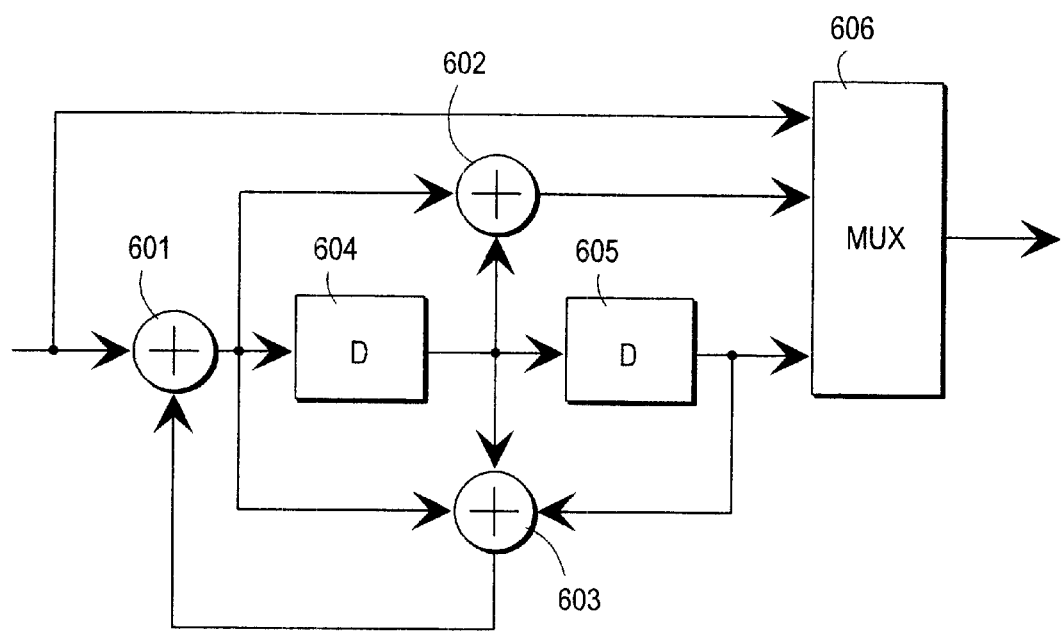
FIG. 6a shows a detail of FIG. 5.

FIG. 6a illustrates the generation of a Recursive Systematic Convolutional Code (RSCC) with a fixed codingrate 1/3. The encoder of FIG. 6a may be used as the inner encoder block 509 of FIG. 5. It consists of three modulo-two adders 601, 602 and 603, two delay elements 604 and 605 of the size of one bit in series, and one three-to-one multiplexer 606. The first input to multiplexer 606 is the current data bit as such. The second input to multiplexer 606 is the output of adder 602, i.e. a combination of the output of delay element 604 and the output of adder 601, both of which are also fed as inputs to adder 603. The third input to multiplexer 606 is the output of second delay element 605, which is also fed as a third input to adder 603, which in turn provides, together with the current data bit the two inputs of adder 601.

Figure 6B:
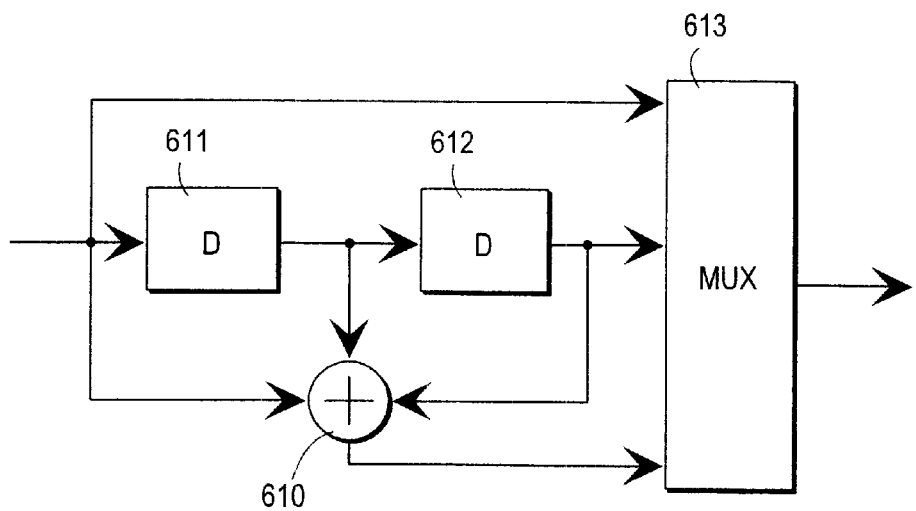
FIG. 6b shows another detail of FIG. 5.
Figure 7:
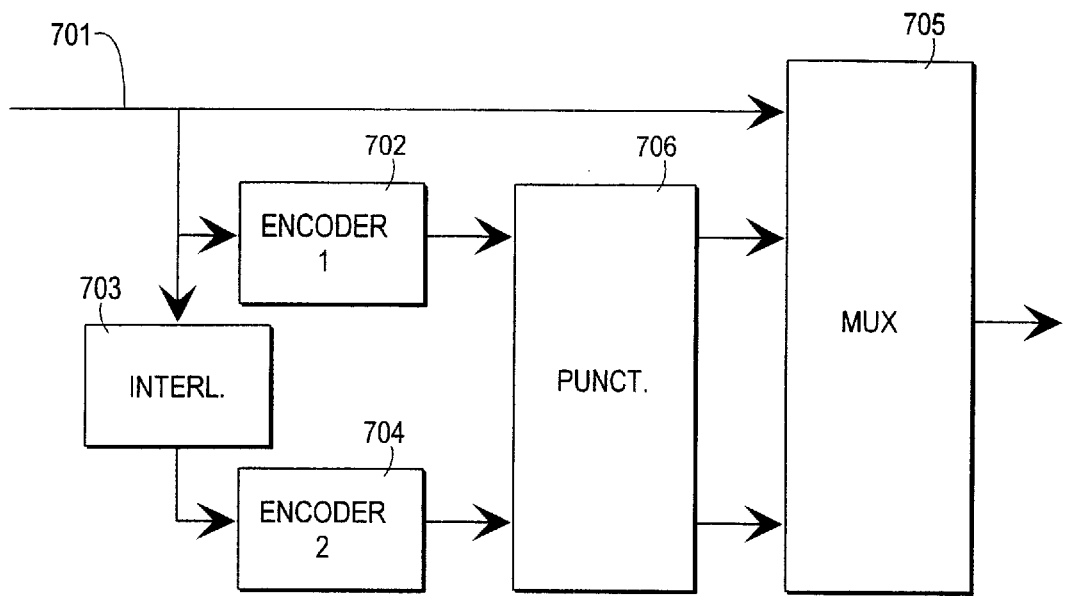
FIG. 7 shows another detail of FIG. 5.

FIG. 6b illustrates the generation of a Non-Recursive Systematic Convolutional Code also with a fixed coding rate 1/3. The encoder of FIG. 6b may be used as the outer encoder block 506 of FIG. 5. It consists of a modulo-two adder 610, two delay elements 611 and 612 of the size of one bit in series, and one three-to-one multiplexer 613. The first input to multiplexer 613 is again the current data bit as such. The second input to multiplexer 613 is the output of second delay element 612, e.g. a data bit that has been delayed by two bit intervals. The third input to multiplexer 613 is the output of adder 610, e.g. the modulo-two sum of the current data bit, the previous data bit and a data bit delayed by two bit intervals.

Previously it was mentioned that the encoder 505 in the upper branch of the HCC encoder 501 in FIG. 5 may be a CC encoder. In another embodiment of the invention the whole upper branch 502 may be replaced with a turbo encoder like the one illustrated in FIG. 7 and known as such from for example the document "S. Le Goff, A. Glavieux, C. Berrou: Turbo-Codes and High Spectral Efficiency Modulation, Proceedings of IEEE ICC'94, May 1–5, 1994, New Orleans, La., pp. 645–649", which is incorporated herein by reference. Input line 701 carries a binary input sequence. The bits of the input sequence are fed directly into a first encoder 702 and through an interleaver 703 into a second encoder 704. Additionally the bits of the input sequence are fed directly to one input of a three-way multiplexer 705. The role of the interleaver 703 is to change the mutual order of the bits in the input sequence in a known way before they are fed into the second encoder 704. The parallel encoders 702 and 704 may in principal be any known binary encoders and their coding rates may be described as $k/(k+p_1)$ and $k/(k+p_2)$ respectively, where k is the number of bits in a given length of the input sequence and the coefficients $p_1$ and $p_2$ depend on the structure of the encoders 702 and 704. They may also be identical to each other. Depending on their coding rate and the expected output rate of the turbo encoder 700 it may be necessary to puncture the outputs of the binary encoders 702 and 704 in the pucturing block 706, resulting the punctured encoded sequences to have rates $k/(k+\underline{p}_1)$ and $k/(k+\underline{p}_2)$, where the coefficients $\underline{p}_1$ and $\underline{p}_2$ depend on the puncturing vector used in block 706 and obey the rules $\underline{p}_1 \leq p_1$ and $\underline{p}_2 \leq p_2$. The punctured encoded sequences are then fed into the remaining two inputs of the three-way multiplexer 705 which generates at its output a systematic code sequence with a rate R, which may be calculated from the formula $$R = \frac{k}{n} = \frac{k}{k + p_1 + p_2} \quad (1)$$

where n denotes the number of bits in the output sequence that correspond to the k bits in a given length of the input sequence.

Figure 8:
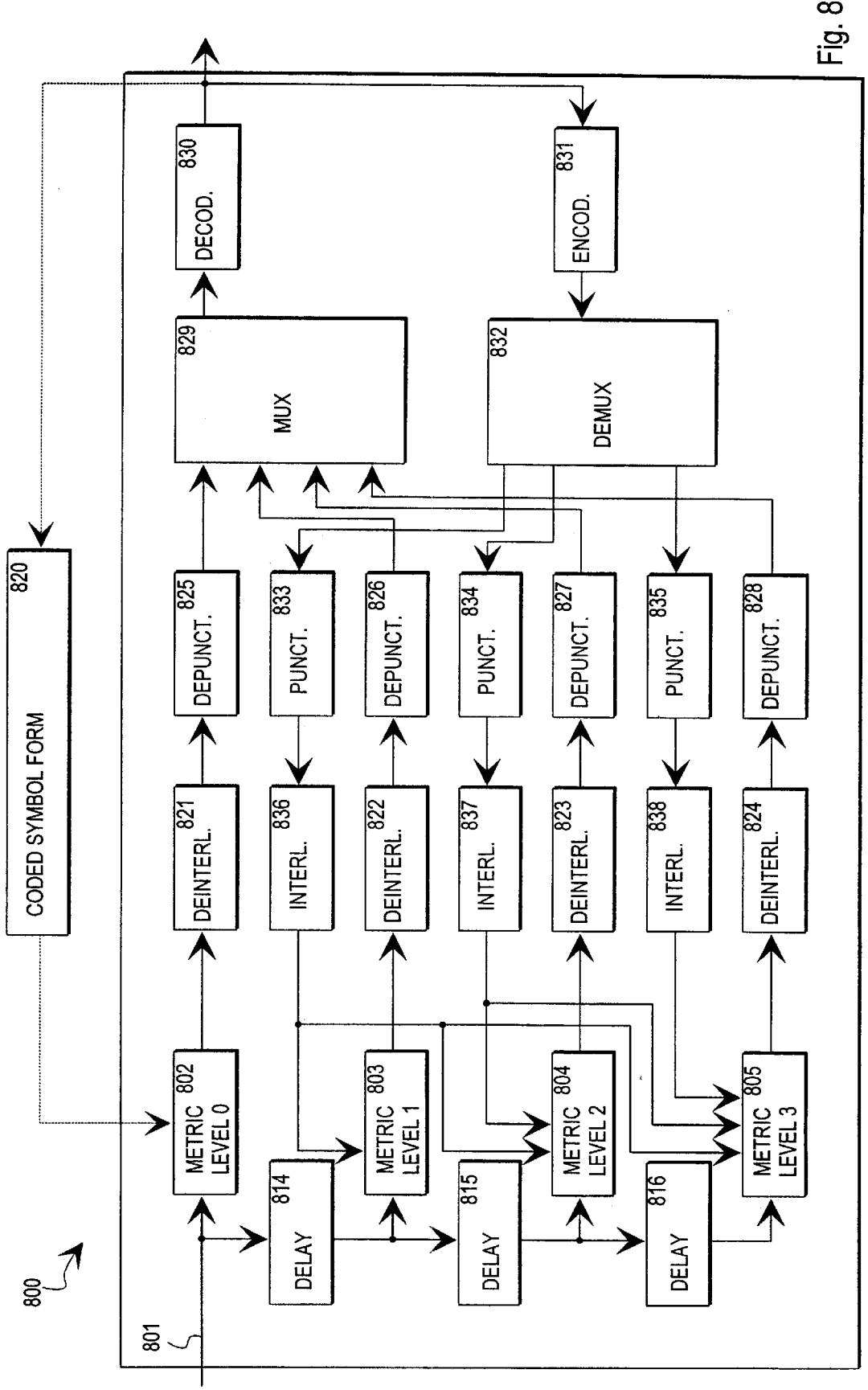
FIG. 8 is a schematic block diagram of an MSD according to the invention.

FIG. 8 shows a block diagram of an MSD 800 that can be used in the receiver according to the invention. Input line 801 carries a received baseband signal that is a combination of the actual signal, gaussian noise and interference. The metric blocks 802 to 805 and their associated delay blocks 814 to 816 operate in the same way as the corresponding blocks 302 to 305 and 314 to 316 in FIG. 3, if the additional input to metric block 802 from block 820 is ignored for the moment. After the metric calculation in each of the blocks 802 to 805 the result is fed from each block to a corresponding deinterleaver block 821 to 824 that reorganises successive metric results to remove the effect of the bit interleaving block 513 in the transmitter of FIG. 5. Similarly the depuncturing block 825 to 828, one of which is connected in series with each deinterleaver block 821 to 824, removes the effect of the corresponding puncturing block 512a to 512d in the transmitter of FIG. 5 by adding an uncertain bit in place of each punctured bit. The results from each depuncturing block 825 to 828 are collected into multiplexer 829 which performs the reciprocal operation of the serial to parallel converter 511 in the transmitter of FIG. 5 and feeds the resulting coded bit stream to decoder 830, the purpose of which is to counteract the operation of the HCC encoder 501 in the transmitter of FIG. 5.

The output signal of decoder 830 is expected to be an error-free stream of data bits just like those that were originally fed into the encoder 501 of FIG. 5. However, the decoding process may produce some erroneous decisions about the values of some bits. The probability of errors can be lowered by producing from the decoded data bits a re-encoded comparison result that will be fed into the decoding process as a feedback. A new decoding round, based on the same received signal but with the help of the feedback is called an iteration round and the process employing it is an iterative decoding process. Block 831 in FIG. 8 represents an encoder that is similar to the HCC encoder 501 of the transmitter. Similarly demultiplexer 832 corresponds to the serial to parallel converter 511 (except for that the MSB output is not used), puncturing blocks 833 to 835 correspond to puncturing blocks 512a to 512c (not 512d, because it corresponds to the MSB component stream) and interleavers 836 to 838 correspond to the all-but-MSB parts of interleaver 513 in FIG. 5. Each metric block 803 to 805 receives as an additional input the encoded form of the corresponding one-less significant bit, which it uses to aid the metric calculation process exactly like in the prior art metric calculation blocks 303 to 305 in FIG. 3. The invention does not limit the number of successive symbols that should be dealt with during an iteration round, but it is dictated by the interleaving length that is used: in order to decode and reconstruct one data frame the receiver must receive all the radio signal frames that contain data of the data frame in question.

Block 820 represents a possibility of producing an additional input also for the LSB metric calculation block 802. Block 820, if used, will include all encoding, demultiplexing, puncturing and interleaving functions that are needed to re-produce a whole symbol from a piece of decoded data bit stream. This symbol is then fed as an additional input into block 802 to aid in the LSB metric calculation.

Figure 9:
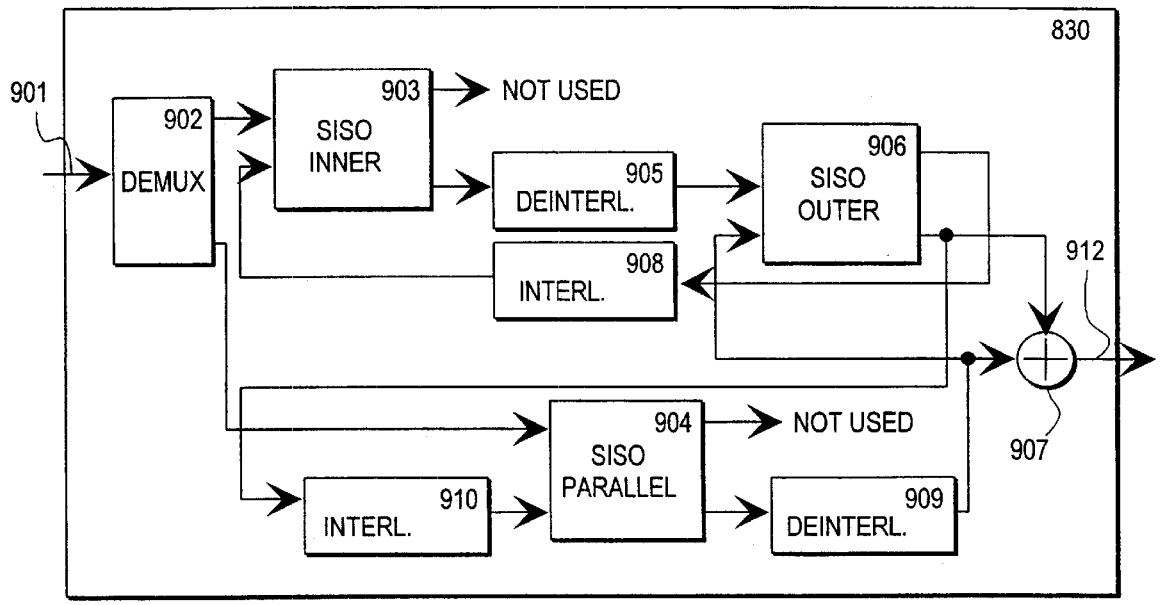
FIG. 9 is a schematic block diagram of a decoder according to the invention.

FIG. 9 is a more detailed block diagram of one advantageous embodiment for the decoder 830. The decoder of FIG. 9 is an iterative decoder for HCC coded bit streams input through line 901. The decoder structure is known as such from the document "D. Divsalar, E. Pollara: Hybrid Concatenated Codes and iterative Decoding, TDA Progress Report 42-130, August 1997", which is incorporated herein by reference. Demultiplexer 902 directs the input stream either into inner CC decoder 903, if the lower encoding branch 503 was used in the transmitter of FIG. 5, or into parallel code decoder 904, if the upper encoding branch 502 was used. This means naturally that the receiving device must know, which coding branch the transmitting device did use. This information is easy to convey from the transmitter to the receiver by the known means of signalling. Taken that the lower encoding branch was used, the input stream is first decoded in decoder block 903 to remove the coding employed in the inner encoder 509 of FIG. 5. To remove the codings any method known as such may be used, for example Viterbi decoding. SISO comes from Soft In- Soft Out and means that the blocks 903, 904 and 906 operate on non-binary information. After the removal of the inner coding the deinterleaving block 905 removes the interleaving implemented in block 508 of FIG. 5 and the signal is fed into decoder block 906 for removal of the puncturing and outer coding implemented in blocks 507 and 506 of FIG. 5. The resulting signal is expected to contain the correct stream of data bits that can be output through summing means 907 and output line 912. However, to employ the error-correcting capabilities of iterative decoding, the output signal from block 906 is also fed as a feedback through re-interleaving block 908 to the additional input of decoder block 903 to aid in the iterative decoding round. The side information contained in this feedback signal tells the number of reception errors, so a separate CRC (Cyclic Redundancy Check) code is not needed for that purpose.

If the transmitted had employed the upper encoding branch 502 of FIG. 5, demultiplexer 902 directs the signal to be decoded to decoder block 904 instead of block 903. Decoding takes place in this single stage and interleaving implemented in block 504 of FIG. 5 is removed in block 909. Feedback to decoder block 904 comes through re-interleaver block 910 for iterative decoding. Also block 904 may calculate the number of reception errors by comparing its two inputs.

If both encoder branches were used in the transmitter, reliability information is shared between all SISO blocks 903, 904 and 906 and the decoder operates on two loops, the first of them consisting of blocks 903–905–906–908 and bringing side information to block 903, and the other one having the structure 903–905–906–910–(side inform.to) 904–909–(side inform.to) 906.

Figure 3:
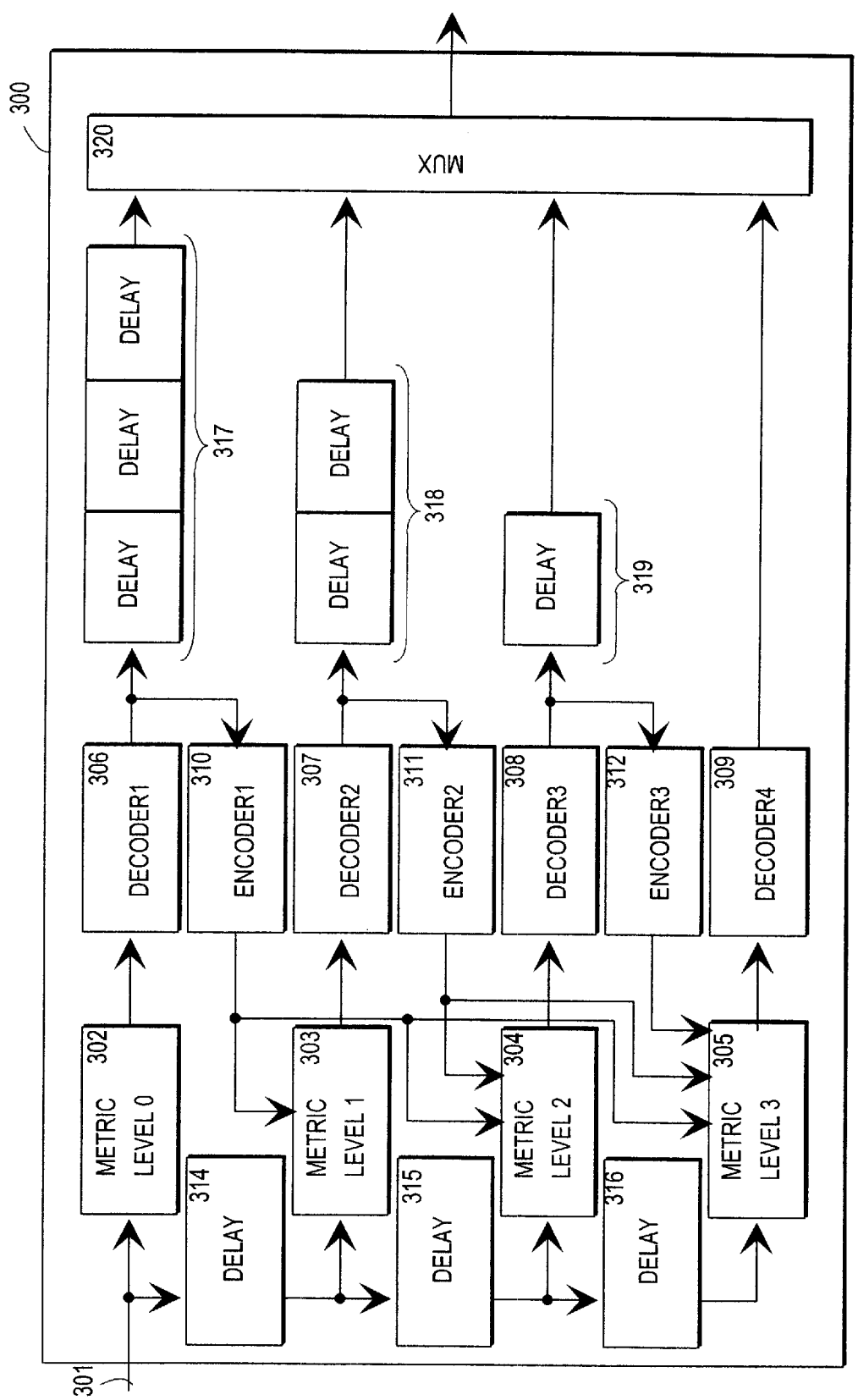
FIG. 3 illustrates a known decoder for use in the system of FIG. 1.

The MSD of FIG. 8 does not comprise explicitly shown any counterparts to the delay lines 317 to 319 of the prior art MSD in FIG. 3. This is due to an aspect of the invention shown in more detail in FIG. 10. In addition to its normal bit interleaving operation, the interleaver 513 of FIG. 5 delays the three least significant component bit streams LSB, LSB1 and LSB2 by three, two and one bits respectively. Ellipse 1001 encircles the bits that would be mapped into a symbol in a prior art MLC encoder. Ellipse 1002 encircles the bits that are mapped into a symbol in an encoder according to this particular aspect of the invention. Delays between decoded component data streams are not needed in the receiver, because the encoded component data streams have already been mutually delayed in the transmitter. The reason for this is to enable the construction of the receiver with a smaller memory than what would be needed with the delays implemented in the receiver side; memory requirements in the transmitter will respectively increase. Taken that there is an overwhelming multitude of terminals compared to the number of base stations in a cellular radio system, it is most advantageous to save memory from the terminals and build the downlink direction according to FIGS. 5, 8 and 10. In the uplink the transmitter of the terminal does not need to delay the encoded component data streams according to FIG. 10, meaning that in a terminal transmitter otherwise according to FIG. 5 the interleaving block 513 would not include the corresponding preliminary data shift feature and the base station receiver otherwise according to FIG. 8 the multiplexer 829 would include delay lines comparable to those of FIG. 3.

FIGS. 8 and 9 both include the option of iterative decoding. The invention does not require the receiver to employ any kind of iterative decoding, but if the computational capacity of the receiver and the delay requirements of the connection permit, it is a useful way to reduce the probability of errors in the decoded data stream. The transmitter side is in no way affected by whether the receiver uses iterative decoding or not, except for the fact that an iteratively decoding receiver will probably ask for fewer retransmissions than a non-iteratively decoding receiver. A manufacturer may first bring to the market a non-iteratively decoding receiver or an iteratively decoding receiver capable of only one or two iteration rounds, and after a new, more effective signal processor or other more advanced component has become available, the manufacturer may launch an upgraded version of the device that is able to iterate more times per received bit or symbol.

Figure 11:
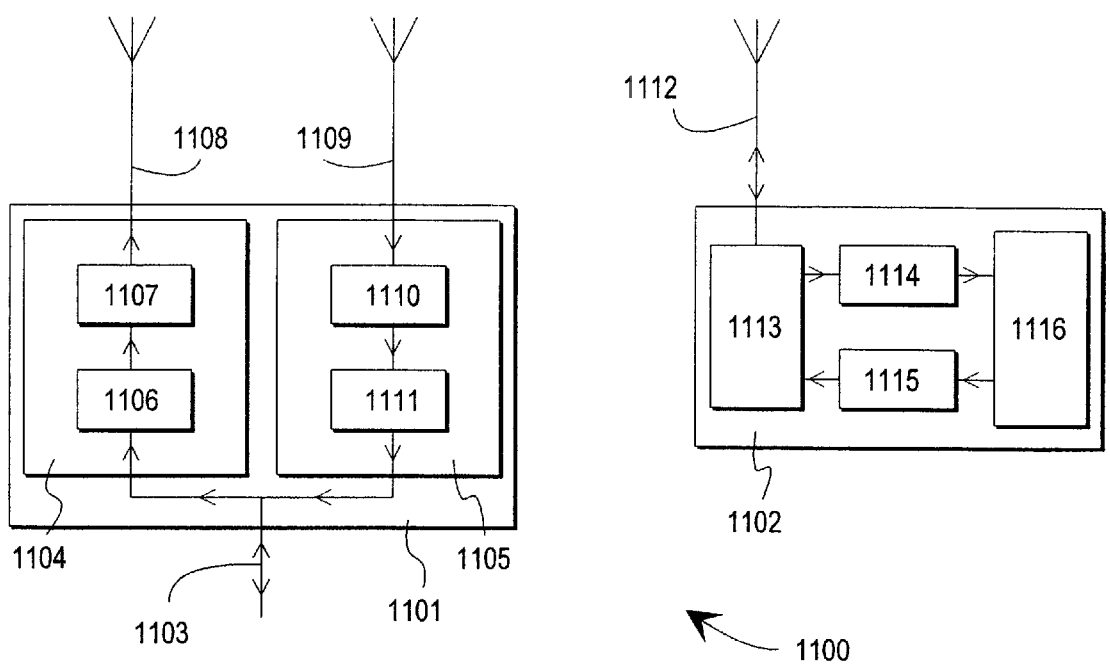
FIG. 11 illustrates the application of the invention into a telecommunications system.
Figure 10:
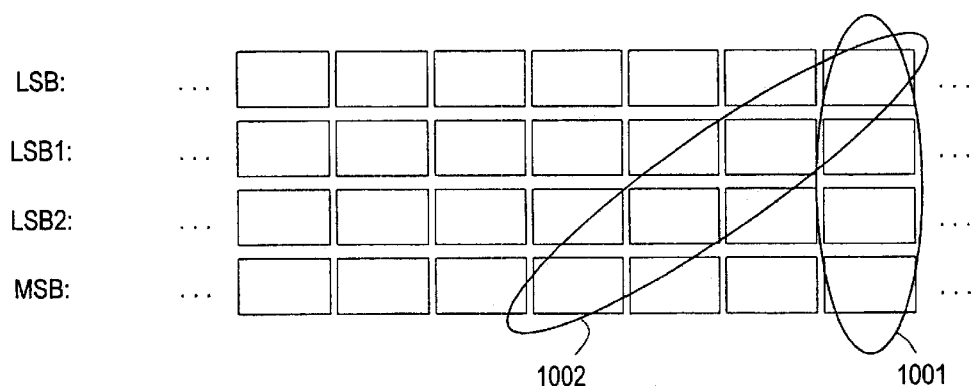
FIG. 10 illustrates an interleaving option according to the invention.

FIG. 11 shows a telecommunication system 1100 comprising a base station 1101 and a terminal device 1102. The base station 1101 is connected to a network of other base stations, base station controllers, mobile switching centres and other elements of a cellular network known as such through the bidirectional connection 1103. The base station comprises a transmitter branch 1104 and a receiver branch 1105, of which the transmitter branch 1104 comprises at least one encoding, puncturing, interleaving and mapping block 1106 similar to the assembly shown in FIG. 5. Radio frequency (RF) part 1107 uses the output symbol stream of block 1106 in a known way to form a RF signal and transmit it to the terminal via a transmitting antenna 1108. Simultaneously a receiving antenna 1109 may pick up signals from the terminal, whereby RF part 1110 converts them into baseband and feeds them into decoding block 1111 similar to that of FIG. 8. On the terminal side there is usually only one antenna 1112 and radio part 1113, where duplex filters or other known arrangements separate transmitted and received signals from each other. The structure and operation of blocks 1114 and 1115 is similar to that of blocks 1106 and 1111 respectively, with the possible exception that component data stream delaying according to FIG. 10 is most advantageously used only in the downlink direction, the hardware consequences of which were discussed above. The basic operational block 1116 of terminal 1102 may be known as such; if the terminal is for example a mobile phone, block 1116 will include the necessary functions to convert the received and decoded data stream into sound directed to a loudspeaker and data directed to the control processor of the terminal, and to convert recorded sound from a microphone and uplink data from the control processor to a data stream to be transmitted. In addition to the blocks shown in FIG. 11, the base station and the terminal may include other functional blocks.

Measuring or estimating signal-to-noise ratio or signal-to-interference ratio or other values that describe the quality of the radio connection in a telecommunication system like that of FIG. 11 are known as such. According to the invention, either base station 1101 or terminal device 1102 or both perform such measurements to determine, what is the optimal amount of coding that would ensure reception of data over the radio path at a satisfactory level of occurring transmission errors. One of the devices 1101 and 1102 makes a decision about which encoding branches ( 502, 503 or both in FIG. 5) will be used in the transmitter and what kind of puncturing will be employed ( 507 and 512$a$ to 512$d$ in FIG. 5). The decision may also contain details of the interleaving to be used ( 504, 508 and 513 in FIG. 5). The decision may be different for uplink and downlink and it may change during a radio connection. The device making or changing the decision will inform the other device about the decision through signalling so that the other device may change its operation accordingly.

What is claimed is:

1. A method for conveying coded digital information in the form of multiple-valued symbols from a transmitter to a receiver, comprising the steps of
    a) encoding the digital information in a Hybrid Concatenated Code encoder,
    b) mapping the encoded digital information into multiple valued symbols in a Multi-Level Coding encoder,
    c) transmitting the multiple-valued symbols,
    d) receiving the multiple-valued symbols, and
    e) decoding the received multiple-valued symbols in a Multi-Stage Decoder.

2. A method according to claim 1, wherein the mapping in step b) takes place according to set partition mapping.

3. A method according to claim 2, wherein the mapping in step b) takes place according to Ungerboeck mapping.

4. A method according to claim 1, wherein the steps a) and b) together implement a Rate Compatible Punctured code.

5. A method according to claim 4, wherein step b) comprises the substeps of dividing the encoded digital information into a predetermined number of encoded component data streams and puncturing each encoded component data stream separately.

6. A method for conveying coded digital information in the form of multiple-valued symbols from a transmitter to a receiver, comprising the steps of
    a) encoding the digital information in a Hybrid Concatenated Code encoder,
    b) mapping the encoded digital information into multiple-valued symbols in a Multi-Level Coding encoder,
    c) transmitting the multiple-valued symbols,
    d) receiving the multiple-valued symbols, and
    e) decoding the received multiple-valued symbols in a Multi-Stage Decoder,
        wherein said multiple-valued symbols are high-level modulation symbols and the number of allowed symbol values is $2^{M}$, where integer M is positive and even, and step b) comprises, in the following order, the substeps of
            dividing the encoded digital information into M encoded component data streams, one of which is the Most Significant Bit stream and the others are less significant bit streams of order M−i, i∈[1, 2, ..., M−1],
            arranging the bit rate of each encoded component data stream to be the same, delaying each less significant bit stream of order M−i by i bits, taking a simultaneous bit from each encoded component data stream, and mapping the binary number formed by the taken simultaneous bits into a symbol.

7. A method according to claim 6, wherein said multipl-evalued symbols are Quadrature Amplitude Modulation symbols.

8. A method for conveying coded digital information in the form of multiple-valued symbols from a transmitter to a receiver, comprising the steps of a) encoding the digital information in a Hybrid Concatenated Code encoder, b) mapping the encoded digital information into multiple-valued symbols in a Multi-Level Coding encoder, c) transmitting the multiple-valued symbols, d) receiving the multiple-valued symbols, and e) decoding the received multiple-valued symbols in a Multi-Stage Decoder, wherein step e) comprises the substeps of estimating the values of a number of received symbols, decoding the bit values corresponding to the estimated values of the received symbols, re-encoding the decoded bit values and using the re-encoded bit values as additional input information during an iterative estimation and decoding round of the same received symbols.

9. A transmitting device for transmitting coded digital information in the form of multiple-valued symbols to a receiver, comprising a Hybrid Concatenated Code encoder for encoding the digital information to be transmitted and a Multi-Level Coding encoder for mapping the encoded digital information into multiple-valued symbols.

10. A transmitting device according to claim 9, further comprising means for changing the code rate with which the digital information to be transmitted is encoded.

11. A transmitting device according to claim 10, which is one of the following: a base station of a cellular radio system, a terminal device of a cellular radio system.

12. A cellular radio system comprising at least one transmitting device according to claim 9.

* * * * *